United States Patent
Muto et al.

(10) Patent No.: US 11,697,751 B1
(45) Date of Patent: Jul. 11, 2023

(54) RESIN COMPOSITION FOR ADHESIVE, ADHESIVE, AND ADHESION STRUCTURE

(71) Applicant: DAINICHISEIKA COLOR & CHEMICALS MFG. CO., LTD., Tokyo (JP)

(72) Inventors: Kazuaki Muto, Tokyo (JP); Kazuya Kimura, Tokyo (JP); Kenichi Takahashi, Tokyo (JP)

(73) Assignee: Dainchiseika Color & Chemicals Mfg. Co., Ltd., Tokyo (JP)

( * ) Notice: Subject to any disclaimer, the term of this patent is extended or adjusted under 35 U.S.C. 154(b) by 0 days.

(21) Appl. No.: 17/995,019

(22) PCT Filed: Mar. 29, 2021

(86) PCT No.: PCT/JP2021/013265
§ 371 (c)(1),
(2) Date: Sep. 29, 2022

(87) PCT Pub. No.: WO2021/200812
PCT Pub. Date: Oct. 7, 2021

(30) Foreign Application Priority Data

Mar. 31, 2020 (JP) ................ 2020-062426

(51) Int. Cl.
| | | |
|---|---|---|
| C09J 175/12 | (2006.01) | |
| C08K 5/15 | (2006.01) | |
| C08G 71/04 | (2006.01) | |
| C09J 11/06 | (2006.01) | |
| B32B 17/06 | (2006.01) | |
| B32B 7/12 | (2006.01) | |
| C08K 5/1515 | (2006.01) | |

(52) U.S. Cl.
CPC .............. *C09J 175/12* (2013.01); *B32B 7/12* (2013.01); *B32B 17/06* (2013.01); *C08G 71/04* (2013.01); *C08K 5/1515* (2013.01); *C09J 11/06* (2013.01); *B32B 2307/54* (2013.01); *B32B 2307/542* (2013.01); *B32B 2457/20* (2013.01)

(58) Field of Classification Search
CPC ....... C09J 175/12; C09J 11/06; C08K 5/1515; C08G 71/04; B32B 17/06; B32B 7/12; B32B 2457/20; B32B 2307/54; B32B 2307/542
USPC .......................................................... 428/415
See application file for complete search history.

(56) References Cited

U.S. PATENT DOCUMENTS

| | | | | |
|---|---|---|---|---|
| 8,765,822 B2 * | 7/2014 | Braun | ................. | A61Q 19/04 514/772.3 |
| 9,416,227 B2 * | 8/2016 | Uruno | ................. | C08G 71/04 |
| 10,689,543 B2 * | 6/2020 | Kimura | ................. | C09D 7/61 |
| 2013/0323491 A1 * | 12/2013 | Takahashi | ............ | C09D 175/12 428/339 |
| 2014/0030526 A1 * | 1/2014 | Uruno | ................. | C08G 71/04 528/370 |
| 2017/0015883 A1 | 1/2017 | Lammerschop et al. | | |
| 2018/0291153 A1 * | 10/2018 | Cron | ................. | C09J 175/06 |
| 2019/0338160 A1 * | 11/2019 | Kimura | ................. | C08J 7/043 |

FOREIGN PATENT DOCUMENTS

| | | | |
|---|---|---|---|
| CN | 106459728 | | 2/2017 |
| JP | 2006009001 A | * | 1/2006 |
| JP | 2008-001789 | | 1/2008 |
| JP | 2008-179689 | | 8/2008 |
| JP | 2009-155407 | | 7/2009 |
| JP | 2017-014417 | | 1/2017 |
| JP | 2017-222760 | | 12/2017 |
| JP | 2018-076509 | | 5/2018 |
| JP | 2018-526472 | | 9/2018 |
| JP | 2018-203939 | | 12/2018 |
| JP | 2019-026799 | | 2/2019 |
| JP | 6500075 | | 4/2019 |

OTHER PUBLICATIONS

Gomez et al. "Synthesis of Polyhydroxy [n]-Polyurethanes Derived from a Carboxydrate Precursor", Macromolecules (2009), vol. 42, No. 21, pp. 8112-8117. (Year: 2009).*

International Search Report, issued in the corresponding PCT application No. PCT/JP2021/013265, dated Jun. 8, 2021, 5 pages (including machine translation).

Chinese Office Action, issued in corresponding Chinese patent application 20218024650.8, dated Jan. 18, 2023, citing JP 2019-026799 and CN 106459728 listed above, 24 pages with partial machine translation of opinion portion.

* cited by examiner

*Primary Examiner* — Michael M. Bernshteyn

(74) *Attorney, Agent, or Firm* — Hamre, Schumann, Mueller & Larson, P.C.

(57) ABSTRACT

The present invention provides a resin composition for an adhesive, being useful as a component of an adhesive having a favorable adhesion property to glass and giving favorable appearance after adhesion. The resin composition for an adhesive contains a polyhydroxyurethane resin. This polyhydroxyurethane resin contains a structural unit formed by polymerizing a compound (A) having at least two five-membered cyclic carbonate structures and a compound (B) having at least two primary amino groups, the polyurethane resin contains a urethane bond, a hydroxy group, and a secondary amino group in the structural unit. Further, this polyhydroxyurethane resin has an amine number of 1 to 50 mgKOH/g and has a hydroxyl number of 10 to 230 mgKOH/g.

9 Claims, No Drawings

RESIN COMPOSITION FOR ADHESIVE, ADHESIVE, AND ADHESION STRUCTURE

TECHNICAL FIELD

The present invention relates to a resin composition for an adhesive, an adhesive, and an adhesion structure.

BACKGROUND ART

In recent years, displays such as liquid crystal displays and organic EL displays, and touch panel displays in which touch panels are combined therewith have become widely spread in various industrial fields. A glass substrate is used in these displays, and it is often the case that the glass substrate is pasted to another member for use. For example, a liquid crystal display is configured by lamination of a plurality of members such as a glass substrate, a transparent electrode, a polarizing plate, and a color filter, and an adhesive has been used for pasting those members together.

Various adhesives have been proposed in the field of displays, and among them, urethane-based adhesives are widely known. A urethane-based adhesive is cured by, for example, a reaction between a hydroxy group and an isocyanate group using a polyol component having a hydroxy group and a polyisocyanate having an isocyanate group, and exhibits a function as an adhesive. For example, Patent Literature 1 discloses an adhesive composition for glass, containing a polybutadiene polyol, a polyisocyanate compound, a polymer of a hydrolyzable silicon group-containing compound, and a radical generator. Further, for example, as a composition for an adhesive for fixing window glass, Patent Literature 2 discloses a composition containing a) a predetermined isocyanate functional component, b) a mixture of a predetermined alkenoate and a predetermined alkanoate, c) a catalyst for a reaction between an isocyanate site and a hydroxyl group, d) a predetermined polyisocyanate, and the like.

On the other hand, as an adhesive exhibiting a favorable adhesion property to a base material composed of a material such as a polyolefin or a metal, Patent Literature 3 has proposed an adhesive containing a polyhydroxy urethane resin derived by a polyaddition reaction between a five-membered cyclic carbonate compound and an amine compound containing a predetermined amount of a dimer diamine. Further, as an adhesive exhibiting a favorable adhesion property to a metal, Patent Literature 4 has proposed an adhesive containing a polyhydroxyurethane resin having a predetermined amount of a structure derived from a particular polyol component, a hydroxy group, a urethane bond, and a carboxy group.

CITATION LIST

Patent Literature

Patent Literature 1: Japanese Patent Laid-Open No. 2008-179689
Patent Literature 2: Japanese Patent No. 6500075
Patent Literature 3: Japanese Patent Laid-Open No. 2017-014417
Patent Literature 4: Japanese Patent Laid-Open No. 2018-203939

SUMMARY Of INVENTION

Technical Problem

An isocyanate group contained in isocyanate-based curing agents which have been widely used for urethane-based adhesives has good reactivity with a hydroxy group, and therefore the isocyanate-based curing agents undergoes reaction with moisture in the air and is likely to generate an outgas due to decarboxylation. Due to this generation of the out gas, bubbles may occur in adhesives after adhesion (after curing reaction). When bubbles occur in the adhesives after adhesion, it may cause lowering of adhesive force or poor appearance. For example, when one of the base materials (adherends) each being an object of adhesion is a transparent base material such as glass, bubbles are easier to notice and therefore poor appearance is more likely to occur.

Accordingly, the present invention intends to provide a resin composition for an adhesive, being useful as a component of an adhesion having a favorable adhesion property to glass and giving favorable appearance after adhesion.

Solution to Problem

That is, the present invention provides a resin composition for an adhesive, containing a polyhydroxyurethane resin containing a structural unit formed by polymerizing a compound (A) having at least two five-membered cyclic carbonate structures and a compound (B) having at least two primary amino groups, the polyhydroxyurethane resin containing a urethane bond, a hydroxy group, and a secondary amino group in the structural unit, wherein the polyhydroxyurethane resin has an amine number of 1 to 50 mgKOH/g, and the polyhydroxyurethane resin has a hydroxyl number of 10 to 230 mgKOH/g.

Advantageous Effects of Invention

The present invention can provide a resin composition for an adhesive, being useful as a component of an adhesive having a favorable adhesion property to glass and giving favorable appearance after adhesion when the adhesive is used together with an epoxy-based curing agent.

DESCRIPTION OF EMBODIMENTS

Hereinafter, embodiments of the present invention will be described, but the present invention is not limited to the following embodiments.

<Resin Composition for Adhesive>

A resin composition for an adhesive of one embodiment of the present invention is a resin composition for an adhesive, which is used as a component of an adhesive together with an epoxy-based curing agent having at least two epoxy groups. Firstly, the resin composition for an adhesive (hereinafter, sometimes simply referred to as "resin composition") will be described, and the epoxy-based curing agent will be described later.

The resin composition for an adhesive contains a polyhydroxyurethane resin. This polyhydroxyurethane resin contains a structural unit formed by polymerizing a compound (A) having at least two five-membered cyclic carbonate structures and a compound (B) having at least two primary amino groups and contains a urethane bond, a hydroxy group, and a secondary amino group in the structural unit. This polyhydroxyurethane resin has an amine number of 1 to 50 mgKOH/g. Further, this polyhydroxyurethane resin has a hydroxyl number of 10 to 230 mgKOH/g. As used herein, the "secondary amino group" contained in the polyhydroxyurethane resin does not mean —NH— in the urethane bond (—NHCOO—).

By using the resin composition containing a particular polyhydroxyurethane resin described above as a component of an adhesive together with an epoxy-based curing agent having two or more epoxy groups, an adhesive having a favorable adhesion property to glass and giving favorable appearance after adhesion can be obtained. It is considered that a curing reaction occurs between the secondary amino group in the particular polyhydroxyurethane resin described above and the epoxy group in the epoxy-based curing agent, and it is considered that the above-described effects are thereby exhibited.

From the viewpoint that the adhesion property to glass is more likely to be enhanced, the particular polyhydroxyurethane resin described above preferably further contains a structure derived from a polyol having a number average molecular weight of 500 to 3000 in the structural unit, as will be described later. Furthermore, the content proportion of the structure derived from the polyol is preferably 5 to 70% by mass, more preferably 10 to 70% by mass, and still more preferably 20 to 65% by mass, based on the total mass of the particular polyhydroxyurethane resin described above. By using such a polyhydroxyurethane resin, an adhesive is likely to exhibit moderate flexibility and strength.

The particular polyhydroxyurethane resin described above is preferably a main component of the resin composition. The resin in the resin composition may substantially be composed of the particular polyhydroxyurethane resin described above, or may be one that contains an additional resin (including a polyhydroxyurethane resin other than the particular polyhydroxyurethane resin described above) together with the particular polyhydroxyurethane resin described above. The content of the particular polyhydroxyurethane resin described above in the resin composition is preferably 50 to 100% by mass, more preferably 60 to 100% by mass, and still more preferably 70 to 100% by mass, based on the total mass of the solid content in the resin composition.

[Polyhydroxyurethane Resin]

Hereinafter, the particular polyhydroxyurethane resin described above will be described in detail, but first of all, a method for producing the polyhydroxyurethane resin will be described for the convenience of the description on the particular polyhydroxyurethane resin described above.

The polyhydroxyurethane contains a structural unit formed by polymerizing a compound (A) having at least two five-membered cyclic carbonate structures and a compound (B) having at least two primary amino groups. As used herein, the compound (A) having at least two five-membered cyclic carbonate structures is sometimes referred to as "cyclic carbonate compound (A)" or sometimes simply referred to as "compound (A)." Further, as used herein, the compound (B) having at least two primary amino groups is sometimes referred to as "amine compound (B)" or sometimes simply referred to as "compound (B)."

The structural unit formed by polymerizing the compound (A) and the compound (B), and the polyhydroxyurethane containing the structural unit can be obtained by subjecting the compound (A) and the compound (B) to a polyaddition reaction. Plural types of monomer components may be used as each monomer component for the compound (A), the compound (B), and the like, thereby the polyhydroxyurethane resin can include copolymers, and therefore the structural unit is complicated and it is difficult to represent the structural unit by one chemical formula. Thus, hereinafter, the structure of the polyhydroxyurethane resin will be described giving examples.

The structure of the polyhydroxyurethane resin will be described from the reaction scheme of the compound (A) having at least two five-membered cyclic carbonate structures and the compound (B) having at least two primary amino groups. As the presupposition, in a reaction between a compound having a five-membered cyclic carbonate structure and an amine, a structure having a hydroxy group is obtained by cleavage of the five-membered cyclic carbonate structure as shown in a model reaction represented by the following reaction formula (R-i). In addition, there are two types of cleavage of the five-membered cyclic carbonate structure, and thereby both of a product of a structure having a primary hydroxy group (a hydroxy group bonded to primary carbon) and a product of a structure having a secondary hydroxy group (a hydroxy group bonded to secondary carbon) are obtained.

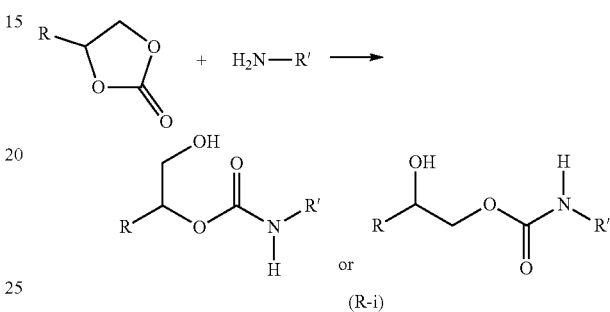

(R-i)

Accordingly, in the polyhydroxyurethane resin, a urethane bond and a hydroxy group are contained in the structural unit formed by polymerizing the cyclic carbonate compound (A) and the amine compound (B). For example, with regard to a polymer obtained by a polyaddition reaction between a compound having two five-membered cyclic carbonate structures, represented by the following formula (A-1), and a diamine compound represented by the following formula (B-1), four types of chemical structures represented by the following formulas (I) to (IV) are produced, and these are considered to be present at random positions. Further, with regard to a polymer obtained by a polyaddition reaction between a compound having two five-membered cyclic carbonate structures, represented by the following formula (A-2) and the diamine compound represented by the following formula (B-1), four types of chemical structures represented by the following formulas (V) to (VIII) are produced, and these are considered to be present at random positions.

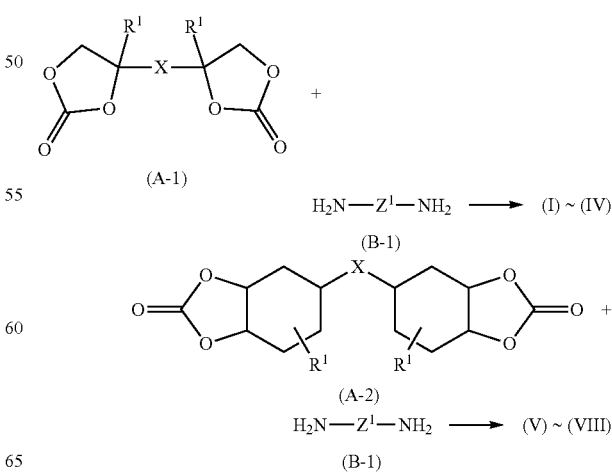

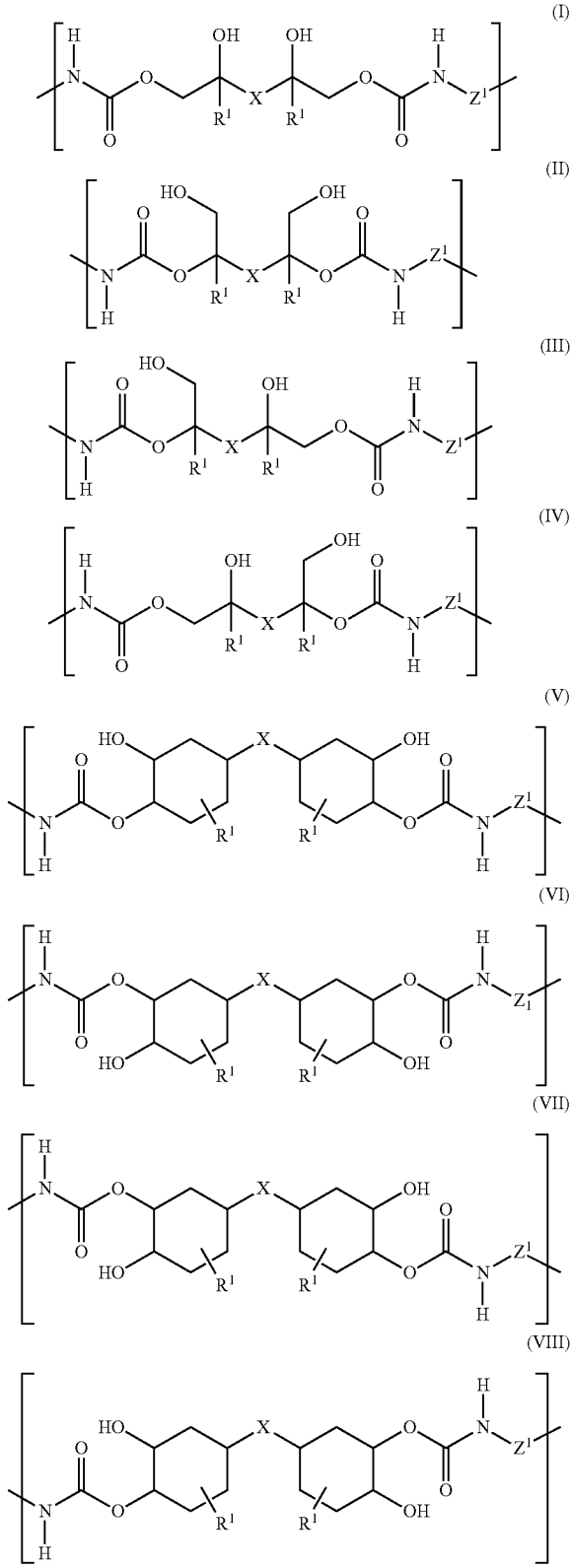

In the formulas (A-1), (A-2), and (I) to (VIII), X represents a direct bond or a divalent organic group, and each of $R^1$ independently represents a hydrogen atom or a methyl group. In the formulas (B-1) and (I) to (VIII), $Z^1$ represents a divalent organic group. For example, as the divalent organic groups represented by X and $Z^1$, divalent hydrocarbon groups (aliphatic hydrocarbon groups, alicyclic hydrocarbon groups, or aromatic hydrocarbon groups) which may contain a hetero atom, such as an oxygen atom, a nitrogen atom, a sulfur atom, and a halogen atom, can be adopted.

(Cyclic Carbonate Compound) (A)

Besides the at least two five-membered cyclic carbonate structures, the cyclic carbonate compound (A), which is one of the raw material components for the polyhydroxyurethane resin, preferably further contains a compound (aII) having a structure derived from a polyol having a number average molecular weight of 500 to 3000 in one molecule. As a result, the structure derived from the polyol having a number average molecular weight of 500 to 3000 can be contained in the structural unit in the polyhydroxyurethane resin and the adhesion property to glass is more likely to be enhanced. From this viewpoint, the compound (A) more preferably contains both of the compound (aII) and a compound (aI), which corresponds to the compound (A) other than the compound (aII).

As used herein, the compound (aII) having at least two five-membered cyclic carbonate structures and a structure derived from a polyol having a number average molecular weight of 500 to 3000 in one molecule is sometimes referred to as "cyclic carbonate compound (aII)" or sometimes simply referred to as "compound (aII)." Further, as used herein, the compound (aI), which corresponds to the compound (A) and which is other than the compound (aII), is sometimes referred to as "cyclic carbonate compound (aI)" or sometimes simply referred to as "compound (aI)" in order to distinguish the compound (aI) from the compound (aII).

(Cyclic Carbonate Compound (aI))

The cyclic carbonate compound (aI) can be obtained by, for example, a reaction between an epoxy compound having at least two epoxy groups in one molecule and carbon dioxide as shown in a model reaction represented by the following formula (Rii). For example, the epoxy compound, which is a raw material, is reacted in the presence of a catalyst at a temperature of 0 to 160° C. for 4 to 24 hours in an atmosphere of carbon dioxide pressurized to about the atmospheric pressure to about 1 MPa. As a result, a compound (compound having two or more five-membered cyclic carbonates) in which carbon dioxide is fixed at an ester site can be obtained. Note that as X in reaction formula (R-ii), X described above can be adopted.

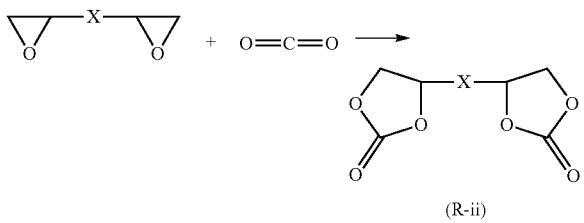

(R-ii)

Examples of the catalyst which is used for the reaction between the epoxy compound and carbon dioxide include halide salts such as lithium chloride, lithium bromide, lithium iodide, sodium chloride, sodium bromide, and sodium iodide; and quaternary ammonium salts. One, or two or more of these can be used. The use amount of the catalyst is preferably 1 to 50 parts by mass, and more preferably 1 to 20 parts by mass, based on 100 parts by mass of the epoxy compound.

Further, the reaction between the epoxy compound and carbon dioxide can also be performed in the presence of an organic solvent. The organic solvent may be one which is capable of dissolving the catalyst. Examples of such an organic solvent include amide-based solvents such as N,N-dimethylformamide and N,N-dimethylacetamide; lactam-based solvents such as N-methyl-2-pyrrolidone; alcohol-based solvents such as methanol, ethanol, and propanol; and ether-based solvents such as ethylene glycol monomethyl ether, ethylene glycol dimethyl ether, propylene glycol methyl ether, diethylene glycol monomethyl ether, diethylene glycol dimethyl ether, and tetrahydrofuran.

The structure of the above-described compound (aI) is not particularly limited as long as it has two or more five-membered cyclic carbonate structures in one molecule. For example, the compound (aI) having a benzene skeleton, an aromatic polycyclic skeleton, or a condensed polycyclic aromatic skeleton, and the compound (aI) having any cyclic carbonate structure such as an aliphatic cyclic carbonate structure or an alicyclic carbonate structure can also be used. Examples of the compound (aI) having a benzene skeleton, an aromatic polycyclic skeleton, or a condensed polycyclic aromatic skeleton include compounds represented by the following structural formulas (a1) to (a7) respectively. Further, examples of the compound (aI) having an aliphatic or alicyclic structure include compounds represented by the following structural formulas (a8) to (a15). In the following formulas, R represents H or $CH_3$.

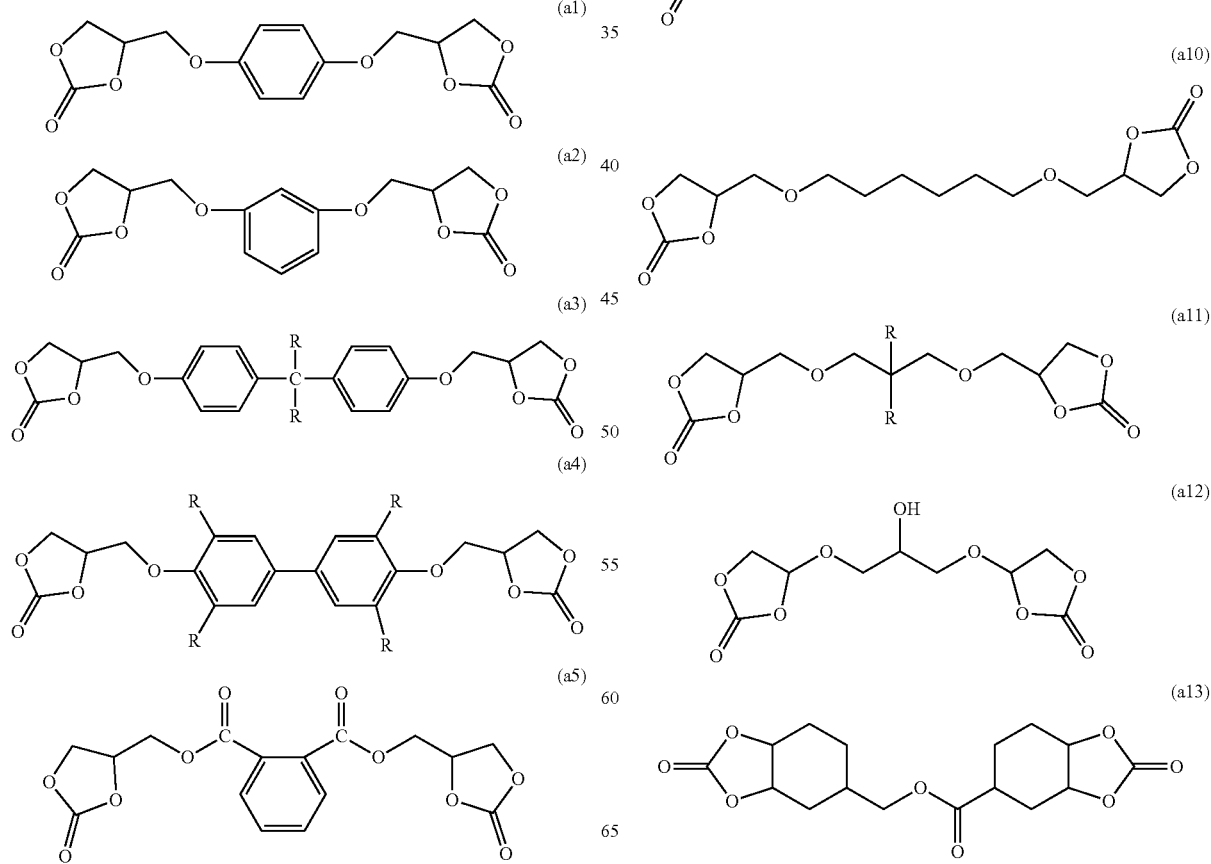

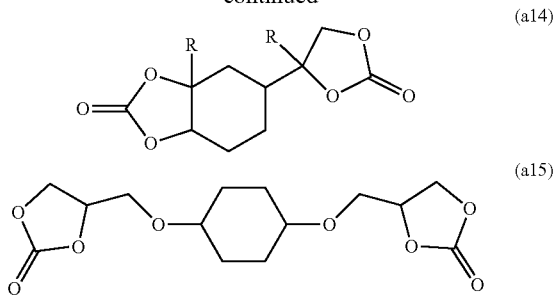

Among the above-described cyclic carbonate compounds (aI), the cyclic carbonate compound (aI) is preferably a compound represented by the formula (A-1), and more preferably a compound represented by the following formula (A-3), in which X in formula (A-1) represents a divalent organic group containing two ether bonds and $R^1$ in formula (A-1) represents a hydrogen atom. $R^x$ in the following formula (A-3) represents a divalent organic group. For example, as the divalent organic group, a divalent hydrocarbon group (aliphatic hydrocarbon group, alicyclic hydrocarbon group, or aromatic hydrocarbon group) which may contain a hetero atom, such as an oxygen atom, a nitrogen atom, a sulfur atom, and a halogen atom, can be adopted. With regard to a polymer obtained by a polyaddition reaction between a compound represented by formula (A-3) as the compound (A) and a compound represented by the formula (B-1) as the compound (B), four types of chemical structures in which $R^1$ in the formulas (I) to (IV) represents a hydrogen atom and X in the formulas (I) to (IV) represents —O—$R^x$—O— are produced, and these are considered to be present at random positions.

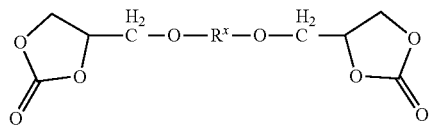

(A-3)

(Cyclic Carbonate Compound (aII))

The cyclic carbonate compound (aII) can be obtained in, for example, the following manner. That is, a polyol having a number average molecular weight of 500 to 3000 (hereinafter, sometimes referred to as "polyol (D)") and a compound having two or more isocyanate groups (hereinafter, sometimes referred to as "isocyanate compound (E)") are reacted under a condition such that the isocyanate group in the isocyanate compound (E) is excessive to the hydroxy group in the polyol (D). Thereafter, by reacting the isocyanate group left unreacted and a compound represented by the following formula (F) (hereinafter, sometimes referred to as "compound (F)"), the compound (aII) can be obtained.

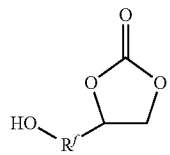

(F)

In formula (F), $R^f$ represents a C1-10 linear or branched alkanediyl group (alkylene group). The carbon number of this alkanediyl group (—$C_nH_{2n}$—; n=1 to 10) is preferably 1 to 6, and more preferably 1 to 4. Examples of suitable alkanediyl groups include a methylene group, an ethylene group, an ethylidene group (ethane-1,1-diyl group), a propylene group (propane-1,2-diyl group), a propylidene group (propane-1,1-diyl group), an isopropylidene group (propane-2,2-diyl group), a trimethylene group (propane-1,3-diyl group), a butane-1,2-diyl group, butane-1,3-diyl group, and a tetramethylene group (butane-1,4-diyl group).

More specifically, the cyclic carbonate compound (aII) can be synthesized in the following manner. First of all, the polyol (D) and a diisocyanate compound being the isocyanate compound (E) are mixed in a blending ratio at which the isocyanate group is excessive to the hydroxy group and reacted at a temperature of 20 to 150° C. to reach the theoretical isocyanate content by percentage (NCO %). As a result, a compound obtained by bonding the isocyanate compound to both ends of the polyol, the compound having an isocyanate group at both ends of the main chain, can be obtained. Subsequently, the compound (F) is added thereto to react a resultant mixture at a temperature of 20 to 150° C. for 1 to 24 hours, and thereby the cyclic carbonate compound (aII) having a structure derived from the polyol (D) and having a five-membered cyclic carbonate structure at both ends can be obtained.

The polyol (D) that can be used in obtaining the cyclic carbonate compound (aII) is a compound having two or more hydroxy groups in one molecule and having a number average molecular weight of 500 to 3000. When the number average molecular weight of the polyol (D) is in the above-described range, thereby the polyhydroxyurethane resin containing a structure derived from the polyol (D) exhibits moderate flexibility, and besides, the compound (aII) that is likely to cause the polymerization reaction with the compound (B) is likely to be obtained.

As the polyol (D), at least one selected from the group consisting of a polyether polyol, a polyester polyol, and a polycarbonate polyol is preferably used, and any of these polyols may be a commercially available product.

The polyether polyol can be obtained by, for example, subjecting a polyhydric alcohol or an amine, and an alkylene oxide to an addition polymerization reaction. Examples of the polyhydric alcohol include ethylene glycol, propylene glycol, 1,4-butanediol, glycerin, trimethylolpropane, and pentaerythritol. Examples of the amine include triethanolamine, ethylenediamine, and diethylenetriamine. Examples of the alkylene oxide include ethylene oxide, propylene oxide, 1,2-butylene oxide, and 2,3-butylene oxide. With regard to any of the polyhydric alcohols, amines, and alkylene oxides which are used for the polyether polyol, one, or two or more thereof may be used. Examples of the polyether polyol include polyethylene glycol, polypropylene glycol, polyoxypropylenetriol, and an ethylene oxide-propylene oxide copolymer. In addition, examples of other polymerization methods for the polyether polyol include ring-opening polymerization of a cyclic ether, and specific examples of such a polyether polyol include polytetramethylene ether glycol, which is a polymer of tetrahydrofuran.

The polyester polyol can be obtained by, for example, subjecting a polyhydric alcohol, and a dicarboxylic acid or a derivative thereof to dehydration condensation. Examples of the polyhydric alcohol include polyhydric alcohols as described above, and one, or two or more polyhydric alcohols can be used for the polyester polyol. Examples of the dicarboxylic acid include aliphatic dicarboxylic acids such as succinic acid, adipic acid, sebacic acid, glutaric acid, and azelaic acid, and aromatic dicarboxylic acids such as isophthalic acid and terephthalic acid. One, or two or more dicarboxylic acids or derivatives thereof can be used for the polyester polyol. In addition, examples of other polymerization methods for the polyester polyol include ring-opening polymerization of a lactone using a divalent alcohol as an initiator.

Examples of the polycarbonate polyol include polytetramethylene carbonate diol, polypentamethylene carbonate diol, polyneopentyl carbonate diol, polyhexamethylene carbonate diol, and poly (1,4-cyclohexanedimethylene carbonate) diol, and random/block copolymers thereof.

The content proportion of the polyol (D) in the cyclic carbonate compound (aII) is preferably set to an amount by which 5 to 70% by mass of the structure derived from the polyol (D) can be contained in the polyhydroxyurethane resin, as described above. From this viewpoint, the content proportion of the polyol (D) in the compound (aII) is preferably 40 to 90% by mass, more preferably 50 to 90% by mass, and still more preferably 60 to 80% by mass, based on the total mass of the cyclic carbonate compound (aII).

The isocyanate compound (E) that can be used in synthesizing the cyclic carbonate compound (aII) may be a compound having two or more isocyanate groups in one molecule. Examples of isocyanate compound (E) include aromatic diisocyanates such as toluene-2,4-diisocyanate, 4-methoxy-1,3-phenylene diisocyanate, 4-isopropyl-1,3-phenylene diisocyanate, 4-chloro-1,3-phenylene diisocyanate, 4-butoxy-1,3-phenylene diisocyanate, 2,4-diisocyanate diphenyl ether, 4,4'-methylenebis(phenylene isocyanate) (MDI), tolylene diisocyanate, tolidine diisocyanate, xylylene diisocyanate (XDI), 1,5-naphthalene diisocyanate, benzidine diisocyanate, o-nitrobenzidine diisocyanate, and 4,4'-diisocyanate dibenzyl; aliphatic diisocyanates such as methylene diisocyanate, 1,4-tetramethylene diisocyanate, 1,6-hexamethylene diisocyanate, and 1,10-decamethylene diisocyanate; alicyclic diisocyanates such as 1,4-cyclohexylene diisocyanate, 4,4-methylenebis(cyclohexyl isocyanate), 1,5-tetrahydronaphthalene diisocyanate, isophorone diisocyanate, hydrogenated MDI, and hydrogenated XDI; and urethane prepolymers obtained by performing a reaction in such a way that the urethane prepolymer has an isocyanate at both ends.

The compound (F) that can be used in synthesizing the cyclic carbonate compound (aII) is a compound having one five-membered cyclic carbonate structure and one hydroxy group, as shown in the formula (F). Examples of the compound (F) include glycerin carbonate, 1,3-dioxolan-2-one-ethanol, 1,3-dioxolan-2-one-propanol, and 1,3-dioxolan-2-one-isobutanol.

When the cyclic carbonate compound (aII) is synthesized, a catalyst or an organic solvent may be used as necessary in the reaction between the polyol (D) and the isocyanate compound (E) and the reaction between the isocyanate group left unreacted and the compound (F). Examples of the organic solvent include ketone-based solvents such as acetone and methyl ethyl ketone; aromatic hydrocarbon-based solvents such as toluene and xylene; aliphatic hydrocarbon-based solvents such as n-hexane; ether-based solvents such as dioxane and tetrahydrofuran; ester-based solvents such as ethyl acetate and butyl acetate; glycol ether ester-based solvents such as ethylene glycol ethyl ether acetate and propylene glycol methyl ether acetate; amide-based solvents such as N,N-dimethylformamide and N,N-dimethylacetamide; and lactam-based solvents such as N-methyl-2-pyrrolidone.

(Amine Compound (B))

Next, the compound (B) having at least two primary amino groups in one molecule (amine compound (B)), which is one of the raw material components for the polyhydroxyurethane resin, will be described. The amine compound (B) preferably contains a compound (b) having a primary amino group at both ends and having at least one secondary amino group in the molecule (hereinafter, sometimes referred to as "amine compound (b)" or sometimes simply referred to as "compound (b)"). By using this amine compound (b), the secondary amino group can be contained in the structural unit formed by polymerizing the cyclic carbonate compound (A) and the amine compound (B) in the polyhydroxyurethane resin.

As the amine compound (b), at least one of a compound (bI) (hereinafter, sometimes referred to as "amine compound (bI)") and a compound (bII) (hereinafter, sometimes referred to as "amine compound (bII)"), which will be described below, is more preferably used.

(Aminw Compound (bI))

As the amine compound (b), a compound (bI) having a primary amino group (—$NH_2$) at both ends of the molecule and having at least one secondary amino group (—NH—; may also be referred to as imino groups) in the molecule, as represented by the following formula (B-1), can be used. The secondary amino group in this amine compound (bI) is left as it is without causing a reaction with the above-described cyclic carbonate compound (A). Therefore, by using the amine compound (bI) as the compound (B), the polyhydroxyurethane resin containing a secondary amino group derived from the amine compound (bI) in the structural unit formed by polymerizing the compound (A) and the compound (B) in the main chain can be obtained.

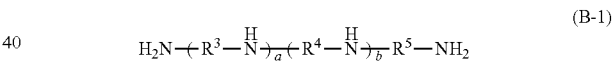

(B-1)

In formula (B-1), $R^3$, $R^4$, and $R^5$ each independently represent a C1-10 alkylene group which may contain an ether bond in the structure thereof. a represents an integer of 0 to 3, and b represents an integer of 1 to 5. The C1-10 alkylene group which may contain an ether bond may be linear or branched. The alkylene group is preferably a C1-6 linear alkylene group, more preferably a C1-4 linear alkylene group, and still more preferably an ethylene group or a trimethylene group (propane-1,3-diyl group).

Examples of the amine compound (bI) represented by the formula (B-1) include diethylenetriamine, triethylenetetramine, iminobispropylamine, tetraethylenepentamine, N,N'-bis(3-aminopropyl)-1,3-propylenediamine, and N,N'-bis(3-aminopropyl)-1,4-butylenediamine. One, or two or more of these can be used. Among the above-described amine compounds (bI), the amine compound (bI) is more preferably diethylenetriamine or triethylenetetramine.

(Amine Compound (bII))

Further, as the amine compound (b), a compound (bII) having a primary amino group (-$NH_2$) at both ends of the molecule and having at least two secondary amino groups (—NH—; may also be referred to as imino groups) and hydroxy groups in the molecule can also be used. For example, as this amine compound (bII), the amine compound (bII) represented by the following formula (B-2) can suitably be used. The amine compound (bII) is obtained by reacting a compound having at least two epoxy groups in one molecule (see, formula (W); hereinafter, sometimes referred to as "epoxy compound (W)") and a compound having at least two primary amino groups in one molecule (see, formula (B-3); hereinafter, sometimes referred to as "amine compound (B-3)") under a condition such that the amino group is excessive to the epoxy group, as exemplified by a model reaction represented by the following reaction formula (R-iii). The secondary amino group in this amine compound (bII) is left as it is without causing a reaction with the above-described cyclic carbonate compound (A). Therefore, by using the amine compound (bII) as the compound (B), the polyhydroxyurethane resin containing a secondary amino group derived from the amine compound (bII) in the structural unit formed by polymerizing the compound (A) and the compound (B) in the main chain can be obtained.

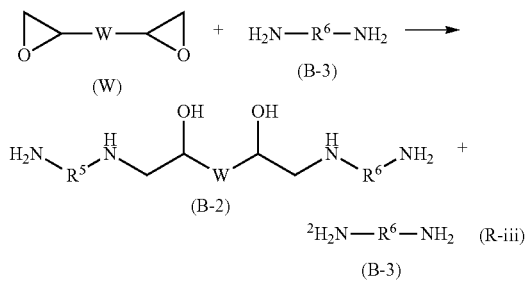

In formula (B-2), W represents a divalent group derived from the epoxy compound (W), and each of $R^6$ independently represents a divalent group derived from the amine compound (B-3). Examples of W include a divalent C1-30 aliphatic hydrocarbon group, a divalent C4-40 alicyclic hydrocarbon group, or a divalent C6-40 aromatic hydrocarbon group, and in the structures of these groups, an ether bond, an amino bond, a sulfonyl bond, an ester bond, a hydroxy group, and a halogen atom, and a polyalkylene glycol chain in which the carbon number of the alkylene group is 2 to 6 and the number of repeating units is 1 to 30 may be contained. Examples of $R^6$ include a divalent C1-15 aliphatic hydrocarbon group, a divalent C4-15 alicyclic hydrocarbon group, or a divalent C6-15 aromatic hydrocarbon group, and in the structures of these groups, an ether bond, a sulfonyl bond, a hydroxy group, and a halogen atom may be contained.

For example, the condition such that the amino group is excessive to the epoxy group in obtaining the amine compound (bII) is preferably a condition such that the equivalent ratio of the amino group to the epoxy group satisfies amino group/epoxy group=4/1 or more. As a result, a mixture of the amine compound (bII) and the amine compound (B-3) left unreacted is obtained as exemplified by a model reaction represented by the reaction formula (R-iii) in the case where the equivalent ratio is 4/1. The polyhydroxyurethane resin can also be produced using this mixture as the amine compound (B). That is, the epoxy compound (W) and the amine compound (B-3) in an excessive amount are reacted, and thereafter, to the reaction solution containing the mixture of the amine compound (bII) and the unreacted amine compound (B-3), obtained by the reaction, the above-described cyclic carbonate compound (A) is added and reacted, and thereby the polyhydroxyurethane resin can also be produced. In this way, together with the above-described amine compound (b) (amine compounds (bI) and (bII)) having a secondary amino group, the amine compound (B-3) other than the amine compound (b) may be used in obtaining the polyhydroxyurethane resin.

Examples of the amine compound (B-3) that can be used as a raw material for the amine compound (bII) include chain aliphatic polyamines such as ethylenediamine, 1,3-diaminopropane, 1,4-diaminobutane, 1,6-diaminohexane (another name: hexamethylenediamine), 1,8-diaminooctane, 1,10-diaminodecane, and 1,12-diaminododecane; cyclic aliphatic polyamines such as isophoronediamine, norbornanediamine, 1,6-cyclohexanediamine, piperazine, and bis(aminopropyl)piperazine; and aromatic polyamines such as xylylenediamine, meta-phenylenediamine, diaminodiphenylmethane, and 2,5-diaminopyridine. One, or two or more of these can be used. Among these, the amine compound (B-3) is preferably a chain aliphatic polyamine.

Further, as the epoxy compound (W) that can be used as a raw material for the amine compound (bII), a compound having the same structure as that of the epoxy compound which is used as the raw material component for the above-described compound (aI) having at least two five-membered cyclic carbonate structures is preferably used. Specifically, the epoxy compound (W) in which W in formula (W) takes the same structure as X in the above-described formulas (A-1), (A-2), and (I) to (VIII) is more preferably used.

The amine compound (B) (the amine compound (bI) or (bII), or a mixture of the amine compound (bI) and the amine compound (B-3), or a mixture thereof) described above and the above-described cyclic carbonate compound (A) (the cyclic carbonate compound (aI) or (aII), or a mixture thereof) are subjected to a polyaddition reaction. As a result, the polyhydroxyurethane resin containing a structural unit formed by polymerizing the compound (A) and the compound (B) and containing a urethane bond, a hydroxy group, and a secondary amino group in the structural unit can be obtained.

For example, with regard to a condition in the reaction between the compound (A) and the compound (B), the compound (A) and the compound (B) may be mixed and reacted at a temperature of 40 to 200° C. for 4 to 24 hours. This reaction can also be performed in the presence of a catalyst or can also be performed without a solvent, but is preferably performed in a solvent. Examples of suitable solvents include tetrahydrofuran, dioxane, N,N-dimethylformamide, N-methylpyrrolidone, dimethyl sulfoxide, methanol, ethanol, propanol, ethylene glycol, propylene glycol, ethylene glycol monomethyl ether, ethylene glycol dimethyl ether, propylene glycol methyl ether, diethylene glycol monomethyl ether, diethylene glycol dimethyl ether, methyl formate, ethyl formate, propyl formate, methyl acetate, ethyl acetate, butyl acetate, toluene, and xylene.

In the above-described method for producing the polyhydroxyurethane resin, the polyhydroxyurethane resin having an amine number of 1 to 50 mgKOH/g and a hydroxyl number of 10 to 230 mgKOH/g can be obtained according to the respective types of the compound (A) and the compound (B), and the adjustment of the use amounts of the compound (A) and the compound (B). This polyhydroxyurethane resin having a particular amine number and a particular hydroxyl number is used for the resin composition of one embodiment of the present invention.

(Characteristics of Polyhydroxyurethane Resin)

The resin composition containing the polyhydroxyurethane resin is used as a component of an adhesive together with an epoxy-based curing agent having at least two epoxy groups in one molecule. On this occasion, from the viewpoint of enabling the curing reaction between the secondary amino group in the polyhydroxyurethane resin and the epoxy group in the epoxy-based curing agent, when the amine number of the polyhydroxyurethane resin composition is too low, it is conceivable that the crosslinking density of the adhesive after curing is too low. As a result, it is conceivable that sufficient adhesion strength and heat resistance are unlikely to be exhibited in the adhesive after curing. On the other hand, when the amine number of the polyhydroxyurethane resin is too high, the crosslinking density is too high, and as a result, it is conceivable that the resin in the adhesive after curing has poor flexibility and is hard and brittle, and is unlikely to exhibit sufficient adhesion strength. From these viewpoints, the amine number of the polyhydroxyurethane resin is set to 1 to 50 mgKOH/g. The amine number of the polyhydroxyurethane resin is preferably 2 mgKOH/g or more, more preferably 5 mgKOH/g or more, and is preferably 40 mgKOH/g or less, more preferably 30 mgKOH/g or less, and still more preferably 20 mgKOH/g or less. As used herein, the "amine number" refers to the value of mg of potassium hydroxide (KOH; having a molecular weight of about 56.1) equivalent to an acid necessary for neutralizing an amine contained in 1 g of a sample (polyhydroxyurethane resin) and is a value measured by potentiometric titration.

Further, the hydroxyl number of the polyhydroxyurethane resin is set to 10 to 230 mgKOH/g. When the hydroxyl number of the polyhydroxyurethane resin is 10 mgKOH/g or more, thereby the adhesion force is likely to be enhanced. On the other hand, when the hydroxyl number of the polyhydroxyurethane resin is 230 mgKOH/g or less, thereby the aggregation force caused by a hydrogen bond is likely to be controlled moderately and moderate flexibility as an adhesive is likely to be obtained. From these viewpoints, the hydroxyl number of the polyhydroxyurethane resin is preferably 10 to 200 mgKOH/g, more preferably 30 to 180 mgKOH/g, and still more preferably 40 to 150 mgKOH/g. As used herein, the "hydroxyl number" refers to the content of a hydroxy group per 1 g of a sample (polyhydroxyurethane resin), expressed by mg equivalent of KOH, and is a value measured in accordance with the titrimetric method specified in JIS K 1557-1.

Furthermore, the number average molecular weight (Mn) of the polyhydroxyurethane resin is preferably 3000 to 100000. When Mn of the polyhydroxyurethane resin is 3000 or more, thereby the adhesion force is more likely to be enhanced. On the other hand, when Mn of the polyhydroxyurethane resin is 100000 or less, thereby the viscosity of an adhesive, when prepared, is likely to be controlled moderately to such an extent that the adhesive is easily applied. From these viewpoints, Mn of the polyhydroxyurethane resin is preferably 3000 to 80000, and more preferably 5000 to 50000. As used herein, the "number average molecular weight" is a value in terms of polystyrene, measured by gel permeation chromatography (GPC) using N,N-dimethylformamide (DMF) as a mobile phase.

Note that the resin composition may contain an organic solvent. From the viewpoint of easily usable for an adhesive, the resin composition preferably contains an organic solvent and preferably takes the form of liquid (the form of solution). For example, any of the above described solvents which can be used for the synthesis of the polyhydroxyurethane resin or any of the organic solvents which are used for the synthesis of the cyclic carbonate compound (A) and amine compound (B), which are used as the raw materials for the polyhydroxyurethane resin, may be contained in the resin composition. In addition, the resin composition may also contain any of various additives which will be described later.

The resin composition containing the polyhydroxyurethane resin that has been described in detail is used as a component of an adhesive together with the epoxy-based curing agent. Thereby, it is considered that the curing reaction occurs in the adhesive between the secondary amino group in the polyhydroxyurethane resin and the epoxy group in the epoxy-based curing agent, so that the adhesive having a favorable adhesion property to glass and giving favorable appearance after adhesion can be obtained. Therefore, the resin composition containing the above-described polyhydroxyurethane resin is more suitable as an adhesive for glass.

[Epoxy-based Curing Agent]

The epoxy-based curing agent is a compound having at least two epoxy groups. As the epoxy-based curing agent, the above-described epoxy compound that can be used for the synthesis of the cyclic carbonate compound (aI) can also be used. Examples of such an epoxy compound include aliphatic bifunctional epoxy-based curing agents such as ethylene glycol diglycidyl ether, neopentyl glycol diglycidyl ether, 1,6-hexanediol diglycidyl ether, hydrogenated bisphenol A diglycidyl ether, diethylene glycol diglycidyl ether, polyethylene glycol diglycidyl ether, polypropylene glycol diglycidyl ether, and 1,4-cyclohexanedimethanol diglycidyl ether; aliphatic multifunctional epoxy-based curing agents such as glycerol polyglycidyl ether, diglycerol polyglycidyl ether, polyglycerol polyglycidyl ether, trimethylolpropane polyglycidyl ether, pentaerythritol polyglycidyl ether, sorbitol polyglycidyl ether, and epoxidized polybutadiene; and aromatic bifunctional epoxy-based curing agents such as bisphenol A diglycidyl ether, resorcinol diglycidyl ether, diglycidyl terephthalate, and diglycidyl phthalate. One of the epoxy-based curing agents may be used singly, or two or more of the epoxy-based curing agents may be used in combination. Among the above-described epoxy-based curing agents, the epoxy-based curing agent is preferably an aliphatic multifunctional epoxy-based curing agent, and more preferably at least one selected from the group consisting of glycerol polyglycidyl ether, polyglycerol polyglycidyl ether, and epoxidized polybutadiene.

The blending ratio of the epoxy-based curing agent to the resin composition in using the resin composition as a component of an adhesive together with the epoxy-based curing agent is preferably determined taking the balance of equivalent between the secondary amino group of the polyhydroxyurethane resin in the resin composition and the epoxy group of the epoxy-based curing agent into consideration. The equivalent ratio of the epoxy group of the epoxy-based curing agent to the secondary amino group of the polyhydroxyurethane resin in the resin composition (epoxy group/secondary amino group) is preferably 0.5 to 2.0, more preferably 0.5 to 1.8, and still more preferably 0.7 to 1.6. In determining the blending ratio, the amine equivalent (g/eq.) of the polyhydroxyurethane resin (HPU) and the epoxy equivalent (g/eq.) of the epoxy-based curing agent can be used. For example, in the case where the epoxy-based curing agent is used setting the equivalent ratio to 1.0, the blending amount of the epoxy-based curing agent can be calculated according to [equivalent ratio 1.0]×[blending amount of HPU/amine equivalent of HPU]×[epoxy equivalent of epoxy-based curing agent]. Further, the amine equivalent of the polyhydroxyurethane resin can be calculated from the above-described amine number (mgKOH/g) according to (56100/amine number) assuming the molecular weight of KOH to be 56.1.

<Adhesive>

An adhesive of one embodiment of the present invention contains the above-described resin composition for an adhesive and the above-described epoxy-based curing agent. This adhesive can be a two-component curable adhesive containing the above-described resin composition for an adhesive as a base resin component and the epoxy-based curing agent as a curing agent component. This adhesive can be prepared by mixing the resin composition for an adhesive and the epoxy-based curing agent. The blending ratio of the epoxy-based curing agent to the resin composition for an adhesive is preferably set in such a way that the equivalent ratio of the epoxy group of the epoxy-based curing agent to the secondary amino group of the polyhydroxyurethane resin in the resin composition for an adhesive falls within the above-described range.

If necessary, the adhesive may contain a catalyst for accelerating the reaction between the secondary amino group of the polyhydroxyurethane resin and the epoxy group of the epoxy-based curing agent. Examples of the catalyst include imidazole compounds, organic phosphorus-based compounds, tertiary amine compounds, quaternary ammonium salts, cyclic amines, and alkali metal compounds. One of the catalysts may be used singly, or two or more of the catalysts may be used in combination.

Further, if necessary, the adhesive may contain an additional resin other than the above-described polyhydroxyurethane resin. Examples of the additional resin include polyurethane-based resins, polyester-based resins, epoxy-based resins, acrylic resins, styrene-based resins, polyolefin-based resins, and phenol-based resins. One of the additional resins may be used singly, or two or more of the additional resins may be used in combination.

Furthermore, if necessary, the adhesive may contain various additives. Examples of the additives include antioxidizing agents (such as hindered phenol-based, phosphite-based, and thioether-based antioxidizing agents), photostabilizers (such as hindered amine-based photostabilizers), ultraviolet absorbers (such as benzophenone-based and benzotriazole-based ultraviolet absorbers), gas discoloration stabilizers (such as hydrazine-based gas discoloration stabilizers), metal deactivators, silane coupling agents, tackiness imparting agents (such as rosin and terpene), plasticizers, fillers, thickeners, and pigments. One of the respective additives may be used singly, or two or more of the respective additives may be used in combination.

The above-described adhesive contains the above-described resin composition for an adhesive and epoxy-based curing agent, and therefore has a favorable adhesion property to glass and gives favorable appearance after adhesion. Therefore, this adhesive is preferably an adhesive for glass, and is preferably applied to a base material made of glass as at least one of the adherends to be adhered together by the adhesive, as will be described below.

[Adhesion Structure]

An adhesion structure of one embodiment of the present invention is an adhesion structure including a first base material made of glass and a second base material adhered to the first base material through the above-described adhesive. The material of the second base material is not particularly limited, examples thereof include glass, a plastic, a metal, and paper, and among these, the second base material is preferably glass or plastic, and more preferably glass. The form of the base material is not particularly limited, but is preferably a sheet or a film, and as the form of the adhesion structure is preferably a laminated body in which the first base material and the second base material are pasted through the adhesive. Examples of suitable applications of the adhesion structure include a member for a display, including at least a component (first base material) made of glass. Examples of the component configuring the member for a display include a glass substrate, a polarizing plate, an electrode sheet, and a color filter.

When the adhesion structure is produced, the above-described adhesive may be provided on any of the first base material made of glass and the second base material. In addition, the adhesive may be directly applied on the base material, or may be transferred to the base material after being applied on a release sheet (such as release paper, or a release film made of a resin). For example, as a method for applying the adhesive on the base material, and the release sheet and the like, methods such as a knife coater, a slot die coater, a lip coater, a roll coater, a flow coater, a spray coater, a bar coater, and dipping can be adopted.

Note that the resin composition for an adhesive of one embodiment of the present invention can take the following constitution.

[1] A resin composition for an adhesive, comprising a polyhydroxyurethane resin comprising a structural unit formed by polymerizing a compound (A) having at least two five-membered cyclic carbonate structures and a compound (B) having at least two primary amino groups, the polyhydroxyurethane resin comprising a urethane bond, a hydroxy group, and a secondary amino group in the structural unit, wherein the polyhydroxyurethane resin has an amine number of 1 to 50 mgKOH/g, and the polyhydroxyurethane resin has a hydroxyl number of 10 to 230 mgKOH/g.

[2] The resin composition for an adhesive according to [1], wherein the polyhydroxyurethane resin has a number average molecular weight of 3000 to 100000.

[3] The resin composition for an adhesive according to [1] or [2], wherein the polyhydroxyurethane resin further comprises a structure derived from a polyol having a number average molecular weight of 500 to 3000 in the structural unit.

[4] The resin composition for an adhesive according to [3], wherein a content proportion of the structure derived from the polyol is 5 to 70% by mass based on the total mass of the polyhydroxyurethane resin.

[5] The resin composition for an adhesive according to [1] or [2], wherein the compound (A) comprises a compound (aII) further having a structure derived from a polyol having a number average molecular weight of 500 to 3000.

[6] The resin composition for an adhesive according to any one of [1] to [5], wherein the compound (B) comprises a compound (b) having a primary amino group at both ends and having at least one secondary amino group in a molecule thereof.

[7] The resin composition for an adhesive according to any one of [1] to [6], wherein the adhesive is an adhesive for glass.

[8] An adhesive comprising: the resin composition for an adhesive according to any one of [1] to [7]; and an epoxy-based curing agent having at least two epoxy groups.

[9] An adhesion structure comprising: a first base material made of glass; and a second base material adhered to the first base material through the adhesive according to [8].

EXAMPLES

Hereinafter, the resin composition for an adhesive of one embodiment of the present invention will more specifically be described giving Examples and Comparative Examples, but is not limited to the following Examples. Note that hereinafter, each of "parts" and "%" is on a mass basis ("parts by mass" and "% by mass" respectively) unless otherwise noted.

Synthesis of Cyclic Carbonate Compound (A)

Synthesis Example 1; Compound (aI-1)

In a reaction container equipped with a stirrer, a thermometer, a gas-introducing tube, and a reflux condenser, 100 parts of bisphenol A diglycidyl ether (trade name "Epotohto YD-128," manufactured by NIPPON STEEL Chemical & Material CO., LTD.) having an epoxy equivalent of 187 g/eq., 100 parts of N-methyl-2-pyrrolidone (NMP), and 20 parts of sodium iodide (manufactured by FUJIFILM Wako Pure Chemical Corporation) were placed and uniformly dissolved to prepare a solution. The solution was reacted at 100° C. for 10 hours under stirring while a carbonic acid gas was being introduced into the reaction container at a rate of 0.5 L/min. After the completion of the reaction, 2000 parts of isopropyl alcohol was added, and a precipitated white precipitate was separated by filtration and dried with a drier to obtain a white powder.

The obtained powder was analyzed by IR using an infrared spectrophotometer (trade name "FT-720," manufactured by HORIBA, Ltd.) to find that an absorption peak around 910 cm$^{-1}$ attributable to the epoxy group of the raw material had disappeared and an absorption peak around 1800 cm$^{-1}$ attributable to a carbonate group (carbonyl group) had newly appeared. Therefore, it was ascertained that the obtained powder is a compound which has a carbonate group having a cyclic structure formed by the reaction between the epoxy group and carbon dioxide, and which is represented by the following chemical formula (aI-1) (hereinafter, referred to as "compound (aI-1)"). Note that IR analysis in the following Synthesis Examples and Production Examples was also performed using the above-described apparatus.

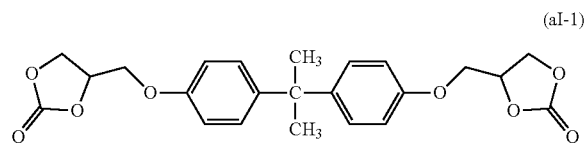 [SMILES: CC(C)(c1ccc(OCC2COC(=O)O2)cc1)c1ccc(OCC2COC(=O)O2)cc1]

(aI-1)

Synthesis Example 2; Compound (aI-2)

A white powder was obtained in the same manner as in the reaction procedure and the procedure after the reaction, described in Synthesis Example 1 above, except that bisphenol A diglycidyl ether used in Synthesis Example 1 was changed to resorcinol diglycidyl ether (trade name "DENACOL EX-201," manufactured by Nagase Chemtex Corporation) having an epoxy equivalent of 117 g/eq. The obtained powder was analyzed by IR in the same manner as in the analysis method described in Synthesis Example 1, and as a result, it was ascertained that the obtained powder is a compound represented by the following chemical formula (aI-2) (hereinafter, referred to as "compound (aI-2)").

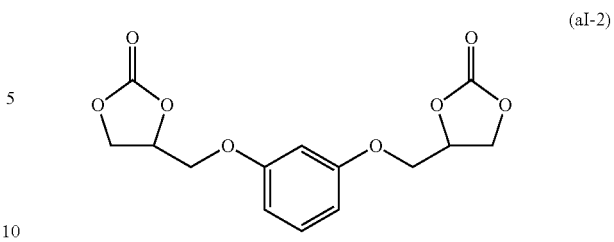

(aI-2)

Synthesis Example 3; Compound (aI-3)

A reaction was performed in the same manner as in the reaction procedure described in Synthesis Example 1 above, except that bisphenol A diglycidyl ether used in Synthesis Example 1 was changed to neopentyl glycol diglycidyl ether (trade name "DENACOL EX-211," manufactured by Nagase Chemtex Corporation) having an epoxy equivalent of 138 g/eq. After the completion of the reaction, 400 parts of ethyl acetate and 800 parts of water were added, and a resultant mixture was stirred for 1 hour. Thereafter, the ethyl acetate phase was recovered, and solvent removal was performed with an evaporator to obtain a compound in the form of viscous liquid. The obtained compound was analyzed by IR in the same manner as in the analysis method described in Synthesis Example 1, and as a result, it was ascertained that the obtained compound is a compound represented by the following chemical formula (aI-3) (hereinafter, referred to as "compound (aI-3)").

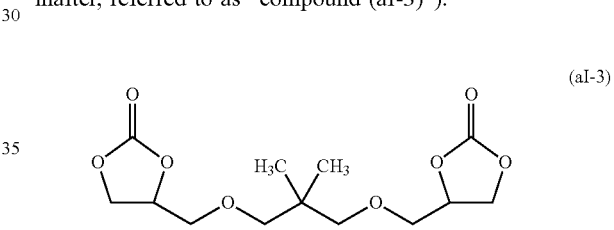

(aI-3)

Synthesis Example 4; Compound (aII-1)

In a reaction container equipped with a stirrer, a thermometer, and a reflux condenser, 100 parts of a polyester polyol (trade name "KURARAY POLYOL P-1010," manufactured by Kuraray Co., Ltd.) having a number average molecular weight of 1000 and 33.6 parts of hexamethylene diisocyanate (HDI) were placed. Then, N,N-dimethylformamide (DMF) was put therein in such a way that the solid content was 30%, and a resultant mixture was dissolved uniformly and thereafter a resultant solution was reacted at 60° C. for 7 hours. Then, after it was ascertained that the isocyanate content by percentage (NCO %) became 1.6%, 23.6 parts of glycerin carbonate was added, and a resultant mixture was reacted further for 5 hours. The completion of the reaction was ascertained by disappearance of the NCO peak around 2260 cm$^{-1}$ by means of IR analysis. In this way, a compound having two five-membered cyclic carbonate structures and having a structure derived from the polyester polyol having a number average molecular weight of 1000 (hereinafter, referred to as "compound (aII-1)") was obtained.

Synthesis Example 5; Compound (aII-2)

In a reaction container equipped with a stirrer, a thermometer, and a reflux condenser, 100 parts of polyethylene glycol having a number average molecular weight of 1500 and 29.6 parts of isophorone diisocyanate (IPDI) were placed. Then, N,N-dimethylformamide (DMF) was put therein in such a way that the solid content was 30%, and a resultant mixture was dissolved uniformly and thereafter a resultant solution was reacted at 60° C. for 7 hours. Then, after it was ascertained that the isocyanate content by percentage (NCO %) became 1.16%, 15.75 parts of glycerin carbonate was added, and a resultant mixture was reacted further for 5 hours. The completion of the reaction was ascertained by disappearance of the NCO peak around 2260 cm$^{-1}$ by means of IR analysis. In this way, a compound having two five-membered cyclic carbonate structures and having a structure derived from a polyether polyol having a number average molecular weight of 1500 (hereinafter, referred to as "compound (aII-2)") was obtained.

Synthesis Example 6; Compound (aII-3)

In a reaction container equipped with a stirrer, a thermometer, and a reflux condenser, 100 parts of a polycarbonate polyol (trade name "ETERNACOLL UH200," manufactured by UBE Corporation) having a number average molecular weight of 2000 and 17.42 parts of tolylene diisocyanate (TDI) were placed. Then, N,N-dimethylformamide (DMF) was put therein in such a way that the solid content was 30%, and a resultant mixture was dissolved uniformly and thereafter a resultant solution was reacted at 60° C. for 7 hours. Then, after it was ascertained that the isocyanate content by percentage (NCO %) became 0.98%, 11.81 parts of glycerin carbonate was added, and a resultant mixture was reacted further for 5 hours. The completion of the reaction was ascertained by disappearance of the NCO peak around 2260 cm$^{-1}$ by means of IR analysis. In this way, a compound having two five-membered cyclic carbonate structures and having a structure derived from a polycarbonate polyol having a number average molecular weight of 2000 (hereinafter, referred to as "compound (aII-3)") was obtained.

Production of Polyhydroxyurethane Resin

Production Example 1; HPU 1

A reaction container equipped with a stirrer, a thermometer, and a reflux condenser was prepared, and the inside thereof was replaced with nitrogen, and thereafter 30 parts of the compound (aI-1) obtained in Synthesis Example 1, 70 parts of the compound (aII-1) obtained in Synthesis Example 4, 8.90 parts of hexamethylenediamine (HMD), and 3.39 parts of diethylenetriamine (DETA) were placed therein. Then, N,N-dimethylformamide (DMF) was put therein in such a way that the solid content was 35%, and a resultant mixture was uniformly dissolved, and a resultant solution was reacted at 80° C. for 10 hours under stirring to obtain a solution of a polyhydroxyurethane resin (hereinafter, referred to as "HPU 1"). The obtained resin (HPU 1) was analyzed by IR to find that an absorption peak around 1800 cm$^{-1}$ attributable to the carbonate group (carbonyl group) had disappeared and an absorption peak around 1760 cm$^{-1}$ attributable to the carbonyl group of a urethane bond had newly appeared. From the above results, it was ascertained that HPU 1 containing a urethane bond, a hydroxy group, and a secondary amino group in a structural unit formed by polymerizing the compound (A), which includes the compound (aI-1) and the compound (aII-1), and the compound (B), which includes HMD and DETA, was obtained.

Production Example 2; HPU 2

In place of the compound (aI-1) and the compound (aII-1), and HMD and DETA, which were used in Production Example 1, 5 parts of the compound (aI-3) obtained in Synthesis Example 3, 95 parts of the compound (aII-2) obtained in Synthesis Example 5, 7.02 parts of meta-xylenediamine (MXDA), and 0.84 parts of triethylenetetramine (TETA) were used. Except for those described above, a solution of a polyhydroxyurethane resin (hereinafter, referred to as "HPU 2") was obtained in the same manner as in Production Example 1. HPU 2 was analyzed by IR in the same manner as in the analysis method described in Production Example 1, and as a result, it was ascertained that HPU 2 as well as HPU 1, containing a urethane bond, a hydroxy group, and a secondary amino group in a structural unit formed by polymerizing the compound (A) and the compound (B), was obtained.

Production Example 3; HPU 3

A reaction container equipped with a stirrer, a thermometer, and a reflux condenser was prepared, and the inside thereof was replaced with nitrogen, and thereafter 10 parts of bisphenol A glycidyl ether (trade name "Epotohto YD-128," manufactured by NIPPON STEEL Chemical & Material CO., LTD.; described as "Epoxy compound 1" in Table 2 below) and 45.9 parts of 1,12-diaminododecane (DAD) were placed therein. Then, N,N-dimethylformamide (DMF) was put therein in such a way that the solid content was 35%, and a resultant mixture was uniformly dissolved and thereafter a resultant solution was reacted at 80° C. for 10 hours under stirring. Subsequently, 50 parts of the compound (aI-2) obtained in Synthesis Example 2 and 50 parts of the compound (aII-3) obtained in Synthesis Example 6 were placed therein, and a resultant mixture was reacted at 80° further for 10 hours to obtain a solution of a polyhydroxyurethane resin (hereinafter, referred to as "HPU 3"). HPU 3 was analyzed by IR in the same manner as in the analysis method described in Production Example 1, and as a result, it was ascertained that HPU 3 as well as HPU 1, containing a urethane bond, a hydroxy group, and a secondary amino group in a structural unit formed by polymerizing the compound (A) and the compound (B), was obtained.

Production Example 4; HPU 4

In place of the compound (aI-1) and the compound (aII-1), and HMD and DETA, which were used in Production Example 1, 30 parts of the compound (aI-1) obtained in Synthesis Example 1, 70 parts of the compound (aII-1) obtained in Synthesis Example 4, 3.82 parts of HMD, and 7.90 parts of DETA were used. Except for those described above, a solution of a polyhydroxyurethane resin (hereinafter, referred to as "HPU 4") was obtained in the same manner as in Production Example 1. HPU 4 was analyzed by IR in the same manner as in the analysis method described in Production Example 1, and as a result, it was ascertained that HPU 4 as well as HPU 1, containing a urethane bond, a hydroxy group, and a secondary amino group in a structural unit formed by polymerizing the compound (A) and the compound (B), was obtained.

Production Example 5; HPU 5

In place of the compound (aI-1) and the compound (aII-1), and HMD and DETA, which were used in Production Example 1, 30 parts of the compound (aI-1) obtained in Synthesis Example 1, 70 parts of the compound (aII-1) obtained in Synthesis Example 4, 11.45 parts of HMD, and 1.13 parts of DETA were used. Except for those described above, a solution of a polyhydroxyurethane resin (hereinafter, referred to as "HPU 5") was obtained in the same manner as in Production Example 1. HPU 5 was analyzed by IR in the same manner as in the analysis method described in Production Example 1, and as a result, it was ascertained that HPU 5 as well as HPU 1, containing a urethane bond, a hydroxy group, and a secondary amino group in a structural unit formed by polymerizing the compound (A) and the compound (B), was obtained.

Production Example 6; HPU 6

In place of the compound (aI-1) and the compound (aII-1), and HMD and DETA, which were used in Production Example 1, 50 parts of the compound (aI-1) obtained in Synthesis Example 1, 11.32 parts of HMD, and 1.12 parts of DETA were used. Except for those described above, a solution of a polyhydroxyurethane resin (hereinafter, referred to as "HPU 6") was obtained in the same manner as in Production Example 1. HPU 6 was analyzed by IR in the same manner as in the analysis method described in Production Example 1, and as a result, it was ascertained that HPU 6 as well as HPU 1, containing a urethane bond, a hydroxy group, and a secondary amino group in a structural unit formed by polymerizing the compound (A) and the compound (B), was obtained.

Production Example 7; HPU 7

In place of the compound (aI-1) and the compound (aII-1), and HMD and DETA, which were used in Production Example 1, 50 parts of the compound (aI-3) obtained in Synthesis Example 3, 24.77 parts of DAD, and 2.01 parts of TETA were used. Except for those described above, a solution of a polyhydroxyurethane resin (hereinafter, referred to as "HPU 7") was obtained in the same manner as in Production Example 1. HPU 7 was analyzed by IR in the same manner as in the analysis method described in Production Example 1, and as a result, it was ascertained that HPU 7 as well as HPU 1, containing a urethane bond, a hydroxy group, and a secondary amino group in a structural unit formed by polymerizing the compound (A) and the compound (B), was obtained.

Production Example 8; HPU 8

In place of the compound (aI-1) and the compound (aII-1), and HMD and DETA, which were used in Production Example 1, 30 parts of the compound (aI-1) obtained in Synthesis Example 1, 70 parts of the compound (aII-1) obtained in Synthesis Example 4, and 11.29 parts of DETA were used. Except for those described above, a solution of a polyhydroxyurethane resin (hereinafter, referred to as "HPU 8") was obtained in the same manner as in Production Example 1.

Production Example 9; HPU 9

In place of the compound (aI-1) and the compound (aII-1), and HMD and DETA, which were used in Production Example 1, 90 parts of the compound (aI-2) obtained in Synthesis Example 2, 10 parts of the compound (aII-1) obtained in Synthesis Example 4, 29.90 parts of HMD, and 2.95 parts of DETA were used. Except for those described above, a solution of a polyhydroxyurethane resin (hereinafter, referred to as "HPU 9") was obtained in the same manner as in Production Example 1.

Production Example 10; HPU 10

In place of the compound (aI-1) and the compound (aII-1), and HMD and DETA, which were used in Production Example 1, 30 parts of the compound (aI-1) obtained in Synthesis Example 1, 70 parts of the compound (aII-1) obtained in Synthesis Example 4, and 12.72 parts of HMD were used. Except for those described above, a solution of a polyhydroxyurethane resin (hereinafter, referred to as "HPU 10") was obtained in the same manner as in Production Example 1.

Production Example 11; PU 1

A reaction container equipped with a stirrer, a thermometer, and a reflux condenser was prepared, and the inside thereof was replaced with nitrogen, and thereafter 50 parts of a polyester polyol (trade name "KURARAY POLYOL P-1010," manufactured by Kuraray Co., Ltd.; described as "Polyol compound 1" in Table 2 below) having a number average molecular weight of 1000, 50 parts of 2,2'-[isopropylidenebis[(p-phenylene)(oxy)]] diethanol (manufactured by FUJIFILM Wako Chemical Corporation; described as "Diol compound 1" in Table 2 below), and 29.20 parts of hexamethylene diisocyanate (HDI) were placed therein. Then, DMF was put therein in such a way that the solid content was 35%, and a resultant mixture was uniformly dissolved and thereafter a resultant solution was reacted at 80° C. for 10 hours under stirring. The completion of the reaction was ascertained by the disappearance of the NCO peak around 2260 cm$^{-1}$ by means of IR analysis, and thus a solution of a polyurethane prepolymer (hereinafter, referred to as "PU 1") was obtained.

The amine numbers, hydroxyl numbers, and number average molecular weights of the resins (HPU 1 to 10, and PU 1) obtained in the respective Production Examples described above were measured by the methods described below.

(Amine Number)

The amine numbers of the resins (HPU 1 to 10, and PU 1) obtained in the respective Production Examples described above were measured as follows. Each resin solution was weighed in an amount of 1 g in terms of solid content (resin) and dissolved in N,N-dimethylformamide (DMF). The dissolved resin solution was titrated by potentiometric titration with 0.05 mol/L of hydrochloric acid, and the amine number (mgKOH/g) was calculated according to the following formula (1).

$$\text{Amine number}\left(\frac{\text{mgKOH}}{\text{g}}\right) = \frac{\text{titer (mL)} \times 0.05 \times 56.1}{\text{mass of solid content of resin (g)}} \quad (1)$$

(Hydroxyl Number)

The hydroxyl numbers (mgKOH/g) of the resins (HPU 1 to 10, and PU 1) obtained in the respective Production Examples described above were measured as follows in accordance with the neutralization titration method specified in JIS K 1557-1. A sample was weighed according to Table 1 below, and 5 mL of an acetylation reagent (obtained by adding pyridine to 25 g of acetic anhydride in such a way that the total volume was 100 mL) was added thereto, and a resultant mixture was reacted at 95 to 100° C. for 1 hour. After the reaction followed by radiational cooling, 1 mL of water was added to the reaction solution, and the reaction solution was shaken and heated again at 95 to 100° C. for 10 minutes, and thus acetic anhydride was decomposed. After radiation cooling, a few drops of phenolphthalein was added as an indicator to perform titration with 0.5 mol/L of an ethanol solution of potassium hydroxide, and the end point was defined as the point in time when pale red color was retained for about 30 seconds. The same operation was performed without using the sample as a blank test. Then, the hydroxyl number was calculated according to the following formula (2).

TABLE 1

| Total value of hydroxyl number and amine value (mgKOH/g) | Mass of sample (g) |
|---|---|
| 10 or more and less than 100 | 2.00 |
| 100 or more and less than 150 | 1.50 |
| 150 or more and less than 200 | 1.00 |
| 200 or more and less than 250 | 0.75 |
| 250 or more and less than 300 | 0.70 |

$$\text{Hydroxyl number}\left(\frac{\text{mgKOH}}{\text{g}}\right) = \qquad (2)$$

$$\frac{(A-B) \times 0.5 \times 56.1}{\text{mass of solid content of resin (g)}} - \text{amine number}$$

wherein

A: amount (mL) of 0.5 mol/L ethanol solution of potassium hydroxide used for blank test B: amount (mL) of 0.5 mol/L ethanol solution of potassium hydroxide used for titration (Number Average Molecular Weight)

The number average molecular weights of the resins (HPU 1 to 10, and PU 1) obtained in the respective Production Examples described above were measured by GPC under the following conditions.

Apparatus: GPC apparatus (trade name "GPC-8820," manufactured by Tosoh Corporation)

Columns: 4 columns (trade name "Super AW2500, AW3000, AW4000, and AW5000," manufactured by Tosoh Corporation)

Eluent: N,N-dimethylformamide (DMF)

Injection volume: 50 μL

Flow rate: 0.5 mL/min

Measurement temperature: 40° C.

Detector: RI detector bult in GPC-8820

Standard substance: standard polystyrene

Results of the measurement of the amine numbers, hydroxyl numbers, and number average molecular weights of the resins obtained in the respective Production Examples described above are shown together with the materials used for production of the respective resins and the amounts (units: parts) of thereof in Table 2 (Table 2-1 and Table 2-2). In Table 2, the content proportion (%) of the structure derived from a polyol, based on the total mass of the resin (solid content), is also shown as "Polyol content ratio (%)." This polyol content ratio was calculated from the use amount of the monomer raw materials for forming the resin.

Preparation of Adhesive Composition

Adhesive compositions of Examples 1 to 7 and Comparative Examples 1 to 5 were prepared using the solutions of the resins (HPU 1 to 10, and PU 1) obtained in the respective Production Examples described above, and epoxy-based curing agents (EP 1, EP 2, and EP 3) and an isocyanate-based curing agent (NCO 1), which are described below. The types and blending amounts of the resins and curing agents, which were used, are as shown in upper rows (units: parts in terms of solid content) in Table 3 (Table 3-1 and Table 3-2).

TABLE 2-1

Materials used for production of resins and amounts thereof (units: parts by mass), and characteristics of obtained resins

| | Production Example No. (Resin No.) | | | | | | |
|---|---|---|---|---|---|---|---|
| | 1 (HPU 1) | 2 (HPU 2) | 3 (HPU 3) | 4 (HPU 4) | 5 (HPU 5) | 6 (HPU 6) | 7 (HPU 7) |
| Compound (aI-1) | 30 | | | 30 | 30 | 50 | |
| Compound (aI-2) | | | 50 | | | | |
| Compound (aI-3) | | 5 | | | | | 50 |
| Compound (aII-1) | 70 | | | 70 | 70 | | |
| Compound (aII-2) | | 95 | | | | | |
| Compound (aII-3) | | | 50 | | | | |
| Epoxy compound 1 | | | 10 | | | | |
| HMD | 8.90 | | | 3.82 | 11.45 | 11.32 | |
| DAD | | | 45.9 | | | | 24.77 |
| MXDA | | 7.02 | | | | | |
| DETA | 3.39 | | | 7.90 | 1.13 | 1.12 | |
| TETA | | 0.84 | | | | | 2.01 |
| Polyol compound 1 | | | | | | | |
| Diol compound 1 | | | | | | | |
| HDI | | | | | | | |
| Polyol content ratio (%) | 39.6 | 60.6 | 24.8 | 39.8 | 39.54 | 0 | 0 |
| Hydroxyl number (mgKOH/g) | 109.40 | 59.62 | 165.00 | 109.94 | 109.10 | 194.52 | 200.77 |
| Amine number (mgKOH/g) | 16.40 | 5.96 | 38.48 | 38.48 | 5.46 | 9.73 | 20.08 |
| Number average molecular weight | 10000 | 6000 | 50000 | 12000 | 12000 | 11000 | 15000 |

TABLE 2-2

Materials used for production of resins and amounts thereof (units: parts by mass), and characteristics of obtained resins

| | Production Example No. (Resin No.) | | | |
|---|---|---|---|---|
| | 8 (HPU 8) | 9 (HPU 9) | 10 (HPU 10) | 11 (PU 1) |
| Compound (aI-1) | 30 | | 30 | |
| Compound (aI-2) | | 90 | | |
| Compound (aI-3) | | | | |
| Compound (aII-1) | 70 | 10 | 70 | |
| Compound (aII-2) | | | | |
| Compound (aII-3) | | | | |
| Epoxy compound 1 | | | | |
| HMD | | 29.90 | 12.72 | |
| DAD | | | | |
| MXDA | | | | |
| DETA | 11.29 | 2.95 | | |
| TETA | | | | |
| Polyol compound 1 | | | | 50 |
| Diol compound 1 | | | | 50 |
| HDI | | | | 29.20 |
| Polyol content ratio (%) | 40.0 | 4.78 | 39.5 | 38.1 |
| Hydroxyl number (mgKOH/g) | 110.36 | 241.48 | 108.96 | 30.1 |
| Amine number (mgKOH/g) | 55.18 | 12.07 | 0.00 | — |
| Number average molecular weight | 10000 | 10000 | 10000 | 10000 |

Note that the blending amount of the epoxy-based curing agent in Examples and Comparative Examples 1 and 2 was determined in such a way that the equivalent ratio of the epoxy group of the epoxy-based curing agent to the secondary amino group of the polyhydroxyurethane resin (HPU) gave the value shown in "Equivalent ratio (E/A)" column in Table 3.

EP 1: polyglycerol polyglycidyl ether (having an epoxy equivalent of 168 g/eq., trade name "DENACOL EX-512," manufactured by Nagase Chemtex Corporation)

EP 2: epoxidized polybutadiene (having an epoxy equivalent of 200 g/eq., trade name "NISO-PB JP-100," manufactured by Nippon Soda Co., Ltd.)

EP 3: glycerol polyglycidyl ether (having an epoxy equivalent of 144 g/eq., trade name "DENACOL EX-314," manufactured by Nagase Chemtex Corporation)

NCO 1: HDI biuret (NCO % =23.5%, trade name "Duranate 24A-100," manufactured by Asahi Kasei Corp.)

Evaluation Method (Tensile Lap-Shear Strength)

A test specimen was prepared for each of Examples and Comparative Examples in the manner as described below using the prepared adhesive compositions. As adherends, two glass plates each having a width of 25 mm, a length of 150 mm, and a thickness of 3 mm were prepared, and the surfaces of the glass plates were washed with ethanol. Each of the adhesive compositions was applied on a region of a length of 10 mm from the one end (width of 25 mm) of one of the glass plates (one end side region of 25 mm×10 mm) with a bar coater in such a way that the thickness after drying was 0.2 mm. Subsequently, another glass plate was overlapped and pasted with the applied surface in the region of a length of 10 mm from the one end (width of 25 mm) thereof in such a way that the overlapped region of the two glass plates coincides with the region of the applied surface, and then the glass plates were temporarily fixed with a crip. A curing reaction was performed under a condition of 60° C. for 24 hours with the state retained as it was, and thus a test specimen for a tensile lap-shear strength test was prepared (see, the test piece described in JIS K6850 "Determination of tensile lap-shear strength of rigid-to-rigid bonded assemblies").

The tensile lap-shear strength (MPa) of each of the prepared test specimens was measured using a tensile tester (trade name "AGS-X 10kN," manufactured by Shimadzu Corporation) under a condition of a tensile speed of 50 mm/min in an environment of 20° C. and 60% RH. The measured value of the tensile lap-shear strength was recorded, and the adhesion property to glass was evaluated based on the measured value according to the following evaluation criteria.

A: the tensile lap-shear strength is 5 MPa or more.
B: the tensile lap-shear strength is 3 MPa or more and less than 5 MPa.
C: the tensile lap-shear strength is less than 3 MPa.

(Appearance after Adhesion)

The appearance of the test specimen for each of the prepared test specimens was visually checked to evaluate the appearance after adhesion according to the following evaluation criteria.

Excellent: a bubble is not ascertained at all in the test specimen.
Poor: a bubble is ascertained in the test specimen.

Results of the above-described evaluation are shown in Table 3 (Table 3-1 and Table 3-2).

TABLE 3-1

| Combinations of adhesive compositions (units: parts by mass) and evaluation results | | | | | | | |
|---|---|---|---|---|---|---|---|
| | Example 1 | Example 2 | Example 3 | Example 4 | Example 5 | Example 6 | Example 7 |
| HPU 1 | 100 | | | | | | |
| HPU 2 | | 100 | | | | | |
| HPU 3 | | | 100 | | | | |
| HPU 4 | | | | 100 | | | |
| HPU 5 | | | | | 100 | | |
| HPU 6 | | | | | | 100 | |
| HPU 7 | | | | | | | 100 |
| HPU 8 | | | | | | | |
| HPU 9 | | | | | | | |
| HPU 10 | | | | | | | |
| PU 1 | | | | | | | |
| EP 1 | 4.91 | | | 11.52 | 1.63 | 2.91 | 6.01 |
| EP 2 | | 1.59 | | | | | |
| EP 3 | | | 14.80 | | | | |
| NCO 1 | | | | | | | |
| Equivalent ratio (E/A) | 1.0 | 0.75 | 1.5 | 1.0 | 1.0 | 1.0 | 1.0 |
| Tensile lap-shear strength (Mpa) | 4.5 | 6.2 | 4.0 | 4.3 | 5.5 | 3.1 | 3.5 |
| Adhesion property | B | A | B | B | A | B | B |
| Appearance | Excellent | Excellent | Excellent | Excellent | Excellent | Excellent | Excellent |

TABLE 3-2

Combinations of adhesive compositions (units: parts by mass) and evaluation results

|  | Comparative Example 1 | Comparative Example 2 | Comparative Example 3 | Comparative Example 4 | Comparative Example 5 |
|---|---|---|---|---|---|
| HPU 1 |  |  |  |  |  |
| HPU 2 |  |  |  |  |  |
| HPU 3 |  |  |  |  |  |
| HPU 4 |  |  |  |  |  |
| HPU 5 |  |  |  |  |  |
| HPU 6 |  |  |  |  |  |
| HPU 7 |  |  |  |  |  |
| HPU 8 | 100 |  |  |  |  |
| HPU 9 |  | 100 |  |  |  |
| HPU 10 |  |  | 100 | 100 |  |
| PU 1 |  |  |  |  | 100 |
| EP 1 |  |  |  |  |  |
| EP 2 |  | 4.30 |  |  |  |
| EP 3 | 14.20 |  |  |  |  |
| NCO 1 |  |  |  | 17.30 | 9.60 |
| Equivalent ratio (E/A) | 1.0 | 1.0 | — | — | — |
| Tensile lap-shear strength (MPa) | 2.3 | 1.7 | 1.2 | 2.0 | 2.1 |
| Adhesion property | C | C | C | C | C |
| Appearance | Excellent | Excellent | Excellent | Poor | Poor |

As shown in Table 3, it was ascertained that the adhesive compositions of Examples 1 to 7 exhibit favorable adhesion force to glass. In contrast, sufficient adhesive force was not obtained from any of the adhesive compositions of Comparative Examples 1 to 5. With regard to the adhesive composition of Comparative Example 1, it is considered that this is because the amine number of HPU 8 used as a component of the adhesive composition was too high and therefore the crosslink density was too high after adhesion (after curing). With regard to the adhesive composition of Comparative Example 2, it is considered that the hydroxyl number of HPU 9 used as a component of the adhesive composition was too high, therefore the resin after adhesin (after curing) had poor flexibility and a hard-and-brittle characteristic, and therefore the adhesive composition did not exhibit adhesion force. In the adhesive composition of Comparative Example 3, a curing agent was not used for HPU 10 not having a secondary amino group, and in the adhesive composition of Comparative Example 4, the isocyanate-based curing agent was used for HPU 10 not having a secondary amino group. From the results of Comparative Examples 3 and 4 and the results of Examples, it was inferred that the curing reaction between the secondary amino group in the particular polyurethane resin and the epoxy group in the epoxy-based curing agent contributes to the adhesion property.

With regard to the appearance after adhesion, the results were favorable in Examples 1 to 7 and Comparative Examples 1 to 3, and therefore it was found that by using the epoxy-based curing agents for the polyhydroxyurethane resins without using the isocyanate-based curing agent, the appearance after adhesion can be made favorable.

The invention claimed is:

1. A resin composition for an adhesive, comprising a polyhydroxyurethane resin comprising a structural unit formed by polymerizing a compound (A) having at least two five-membered cyclic carbonate structures and a compound (B) having at least two primary amino groups, the polyhydroxyurethane resin comprising a urethane bond, a hydroxy group, and a secondary amino group in the structural unit, wherein
   the polyhydroxyurethane resin has an amine number of 1 to 50 mgKOH/g, and
   the polyhydroxyurethane resin has a hydroxyl number of 10 to 230 mgKOH/g.

2. The resin composition for an adhesive according to claim 1, wherein the polyhydroxyurethane resin has a number average molecular weight of 3000 to 100000.

3. The resin composition for an adhesive according to claim 1, wherein the polyhydroxyurethane resin further comprises a structure derived from a polyol having a number average molecular weight of 500 to 3000 in the structural unit.

4. The resin composition for an adhesive according to claim 3, wherein a content proportion of the structure derived from the polyol is 5 to 70% by mass based on the total mass of the polyhydroxyurethane resin.

5. The resin composition for an adhesive according to claim 1, wherein the compound (A) comprises a compound (aII) further having a structure derived from a polyol having a number average molecular weight of 500 to 3000.

6. The resin composition for an adhesive according to claim 1, wherein the compound (B) comprises a compound (b) having a primary amino group at both ends and having at least one secondary amino group in a molecule thereof.

7. The resin composition for an adhesive according to claim 1, wherein the adhesive is an adhesive for glass.

8. An adhesive comprising:
   the resin composition for an adhesive according to claim 1; and
   an epoxy-based curing agent having at least two epoxy groups.

9. An adhesion structure comprising:
   a first base material made of glass; and
   a second base material adhered to the first glass through the adhesive according to claim 8.

* * * * *